March 16, 1965 S. TAMNY 3,173,777
POWER SWEEPER FILTERING SYSTEM
Filed Feb. 5, 1962 2 Sheets-Sheet 1

SIMON TAMNY
INVENTOR.

BY White and Haefliger
ATTORNEYS

March 16, 1965     S. TAMNY     3,173,777
POWER SWEEPER FILTERING SYSTEM
Filed Feb. 5, 1962     2 Sheets-Sheet 2
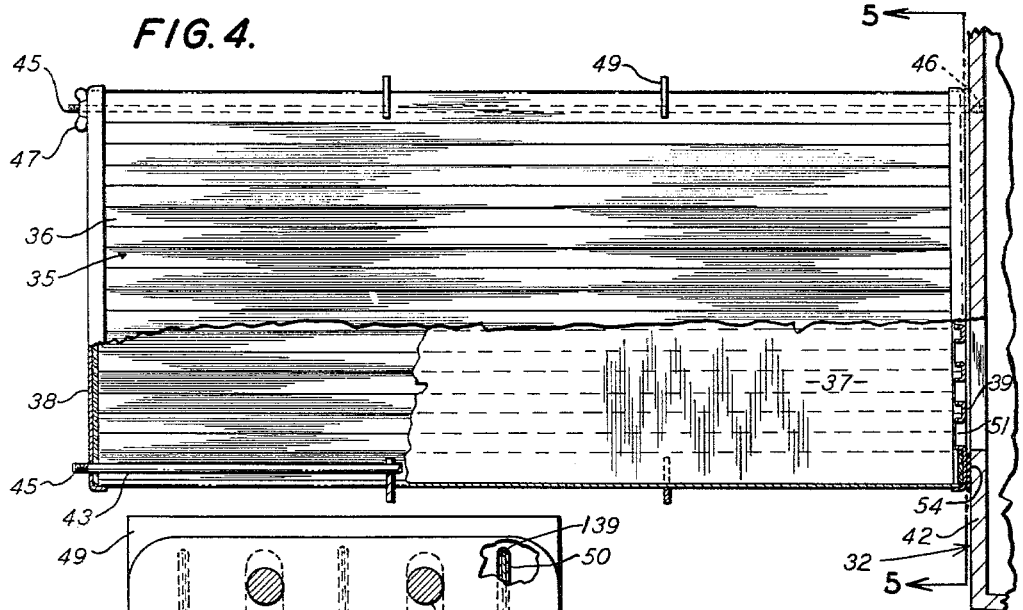
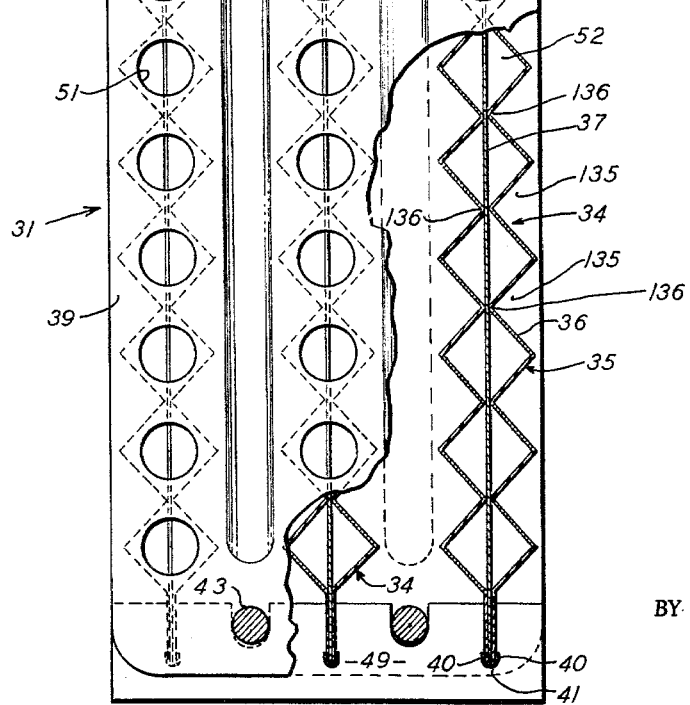
SIMON TAMNY
INVENTOR.
BY White and Haefliger
ATTORNEYS

3,173,777
POWER SWEEPER FILTERING SYSTEM
Simon Tamny, Los Angeles, Calif., assignor to Wayne Manufacturing Company, Pomona, Calif., a corporation of California
Filed Feb. 5, 1962, Ser. No. 171,148
8 Claims. (Cl. 55—341)

This invention relates generally to power sweeper equipment, and more particularly concerns improvements in sweeper dust control systems.

The invention is particularly applicable to and in combination with a power sweeper wherein debris is swept up by a main broom and carried by brushes and vacuum air flow into a hopper zone. To prevent flow of dust in the air stream from the hopper to and through the blower creating the vacuum conditions, filtering apparatus is provided in the path of the air flow to the blower, and it is a major object of the invention to provide an improved and novel self-cleaning filter system comprising an array or assembly of filter units characterized as having long duty life and as being readily removable and replaceable individually or in groups.

As related to a mobile sweeper having a hopper chamber for receiving swept articles and a blower for creating vacuum induced air flow from the hopper, the broader concept of the invention concerns the provision of multiple air filter shells, comprised of air permeable material forming multiple re-entrant recesses communicating with the hopper chamber so that suction air flows in separate streams through the filter shells the interiors of which are communicable with a blower, and the shells having elevated exposure to the hopper interior so that filtered particles will gravitate out of the shell recesses and into the hopper. Air flowing between the shell interiors and blower passes through a manifold to which the shells or group thereof are individually and detachably connected in such a way as preferably to have cantilevered lengthwise projection into overlying relation to the lower interior of the hopper chamber, facilitating ready replacement of the shells through a chamber opening having a removable closure.

The shells themselves have sides typically constructed of filter paper and extending in generally vertical and parallel planes, the sides having corrugations running generally lengthwise along the projected extent of the shells and tapering outwardly or sidewardly so as to form downwardly inclined ledges off which filtered particles tend to gravitate. As thus constructed the shells may be grouped in assemblies or units with metallic stiffeners extending lengthwise of the shells and between shell end plates, for lending required support to the assemblies as they project endwise or lengthwise from the the supporting manifold with which the blower communicates.

These and other objects and advantages of the invention, as well as the details of an illustrative embodiment, will be more fully understood from the following detailed description of the drawings, in which:

FIG. 4 is an enlarged side elevation, partly broken away, showing a filter shell used in the sweeper; and FIG. 5 is an enlarged section taken on line 5—5 of FIG. 4.

Figure 1:
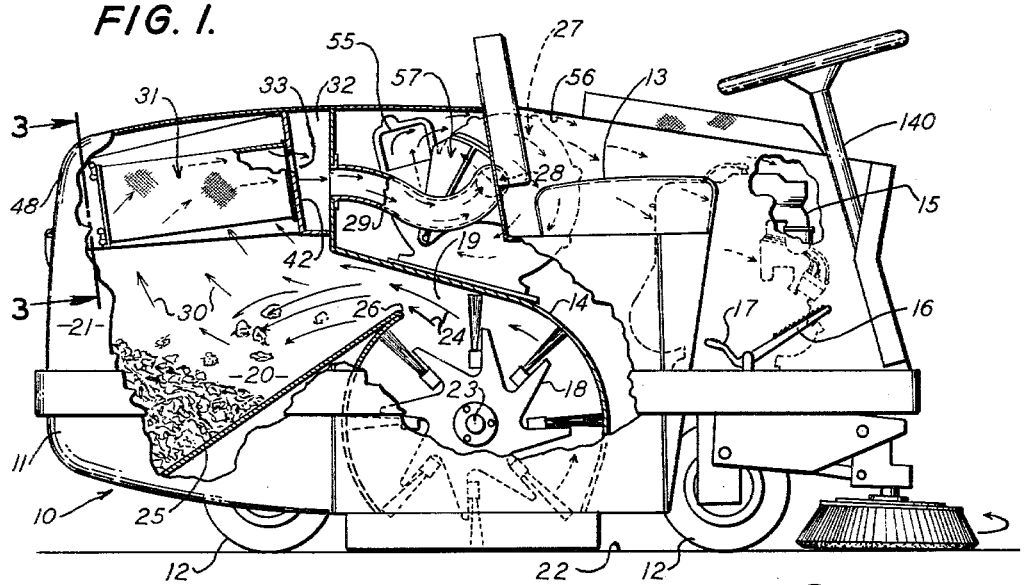
FIG. 1 is a vertical elevation taken through a mobile power sweeper embodying the invention.

Referring first to FIG. 1 the sweeper vehicle 10 includes a body 11 supported on wheels 12 for forward travel under the control of an operator seated at 13 above the broom chamber 14. Steering gear is shown in part at 140, and the vehicle engine is outlined at 15, the operator controlling vehicle forward speed by means of a foot treadle comprising a vehicle forward treadle 16 and a vehicle reverse treadle 17. The main broom chamber 14 contains a rotary broom 18 which is driven by the engine to sweep debris upwardly within the forward interior of the chamber and then rearwardly through an outlet 19 for discharge into a hopper section 20 of a chamber 21. Such debris enters the lower inlet of the broom chamber 14 as the vehicle travels over the surface 22 upon which the debris lies.

In this connection, it will be realized that the hopper section 20 of the chamber 21 has desirably large capacity as a result of the location of the outlet opening 19 at a relatively high elevation which circumstance is made possible by broom rotation carrying particles upwardly and over the broom axis 23 in the direction shown by the arrows 24.

The hopper section 20 is formed above a bottom 25 of the chamber 21 which is inclined upwardly and forwardly toward the opening 19 and to terminate at a point of juncture 26 with the broom chamber. Discharge of swept particles through the opening 19 and into the hopper is aided by partial vacuum conditions created by operation of a blower 27 having an intake 28 to which air passes through a conduit 29 located generally above the broom chamber 14. In passing to the conduit, air is drawn upwardly from the hopper zone 20 as indicated by the arrows 30, for passage through a filter zone 31 within the upper interior of the chamber 11 wherein dust particles are separated from the air stream.

Located within the filter zone 31 is an array of air filter shell assemblies into which and through which air flows in separate streams in passing to the blower 27. After passing through the air filter shell assemblies, the air enters a manifold generally shown at 32, and with which the conduit 29 communicates through the opening 33.

It is a feature of the invention that the filter shell assemblies such as are shown in FIG. 5 are carried in the array by the manifold, and are removably attached thereto so as to project lengthwise with elevated exposure into overlying relation to the lower interior of the chamber, so that filtered particles may gravitate into the hopper section 20 after falling off the filter shells.

Figure 3:
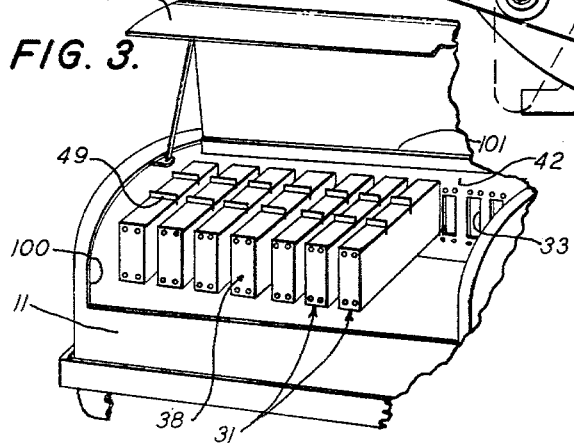
FIG. 3 is an enlarged section taken on line 3—3 of FIG. 1.

Referring to FIGS. 3 through 5, the shell assemblies 31 each typically include three shells 34 having air permeable, relatively stiff filter paper sides 35 extending generally vertically. Also, the shell sides have corrugations or pleats 36 running generally lengthwise along the projected extent of the shells and tapering sidewardly to form re-entrant recesses 135 and downwardly inclined ledges off which filtered particles tend to gravitate out of the recesses for collection in the hopper section 20. The air filter shell assembly also includes metallic stiffeners, typically in the form of vertical plates 37, extending lengthwise and within the shells, there being end plates 38 and 39 interconnecting the stiffeners 37 at lengthwise opposite ends of the assembly. The innermost terminals of the corrugations are bonded at 136 to the plates 37. In this connection, each shell 34 may comprise a single sheet of filter paper which is doubled back upon itself at 139 and over the edge of a stiffener plate 37, the two terminals 40 of the sheet being clipped together at 41 proximate the opposite edge of the plate 37. Accordingly, an unusually strong yet completely serviceable filter assembly is formed by the multiple shells constructed as shown in FIG. 5, with unusually large useful filter surface area and with vertical space between the shells to allow downward gravitation of filtered particles off the shells and into the hopper.

The assemblies 31 are typically individually attached to the plate 42 of the manifold 32 as by means of elongated connectors 43 running between and through end plates 38 and 39 as shown in FIG. 5, there being suitable openings 44 in the end plates to facilitate removal of the connectors. As an example, the ends of the connectors may be threaded as shown at 45 and 46 so as to permit screwing thereof into the plate 42 of the manifold 32 and attachment of a wing nut or other type fastener to the opposite thread ends 45 of the connectors. FIGS. 4 and 5 show spacers 49 extending transversely in bridging relation to the vertical terminals of the shells so as to hold them in transversely spaced relation intermediate their opposite ends. For this purpose the spacers may be slotted as shown at 50 to receive the vertical terminals of the shells.

The array of filter shell assemblies is directly accessible within the upper interior of chamber 11 upon removal of the cover 48 or closure portion of the chamber 11, and away from an opening 100 formed in the upper portion of the chamber. The cover is typically hinged at 101 so as to be lifted for exposing the filter assemblies. Accordingly, the filter assemblies may then be serviced or otherwise removed and replaced as desired to facilitate use of the sweeper.

Reference to FIGS. 4 and 5 will show that the end plate 39 contains vertical rows of openings 51 in registration with the passages 52 formed by the filter shells so as to pass air streams into the manifold 32 through the opening 33 in the manifold plate 42. In this connection, it will be understood that the end plates 39 of the filter shell assemblies overlap the portions of the plate 42 bounding the openings 33 as is clear from FIG. 4 and are held in this position by the connectors 43. Suitable gasketing is provided at 54 to seal off between the end plates 39 and the manifold plate 42.

Figure 2:
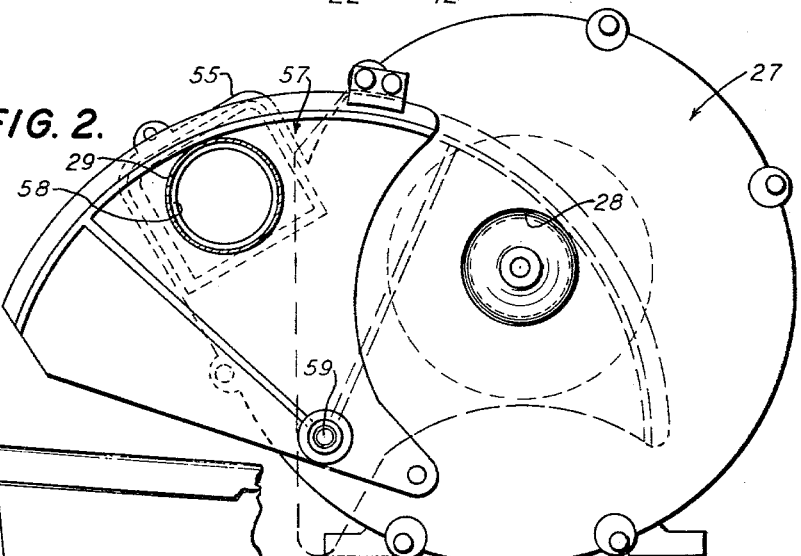
FIG. 2 is an enlarged elevation showing the mechanism to reverse air flow through the filter system.

Referring back to FIGS. 1 and 2, the blower 27 has an outlet or discharge at 55 from which filtered air is discharged to flow in the direction of the arrows 56 toward the engine 15 for cooling same. The invention further contemplates the provision of valve means for alternately placing the blower intake and discharge in series communication with the manifold. A typical valve serving this purpose is shown in the form of a plate 57 in FIG. 2 with one end of flexible conduit 29 carried by the plate at 58. The plate is typically pivoted such as is shown at 59 in order to swing between a first position shown in FIG. 1 in which the conduit 29 is in direct communication with the blower intake 28, and a second position shown in FIG. 2 in which the conduit 29 is in direct communication with the blower outlet 55. Accordingly, under the conditions shown in FIG. 2 the discharge of the blower flows reversely through the conduit 29 and the manifold 32 to enter the passages 52 within the air filter shells. Such air then escapes through the filter paper to blow off filtered particles which have lodged against the ledges or other portions of the shells, with the result that the shells are cleaned and the particles may gravitate into the hopper region 20. In this connection, it will be understood that the valve may be operated as described at periodic intervals in order to assure complete cleaning of the shells. Thereafter the plate may be swung back to the position shown in FIG. 1 for normal operation.

I claim:

1. In a mobile power sweeper, a chamber having a lower hopper section for receiving swept articles, means including a blower and an array of air filter shell assemblies communicating with said chamber so that suction air flows between the hopper chamber and blower and in separate streams through the filter shells in said assemblies, and a manifold communicating with the interiors of said filter shells and the blower, each shell being comprised of air permeable material forming multiple re-entrant recesses, said shell assemblies being carried in said array by the manifold and being removably attached thereto so as to project lengthwise with elevated exposure into overlying relation to the lower interior of the chamber in such manner that filtered particles gravitate out of said recesses into the hopper section, each assembly including at least two shells having filter paper sides extending generally vertically, adjacent shells being closely spaced in side by side relation and supported to resist outward displacement of the shell material forming said recesses and toward adjacent shell structure for maintaining generally vertically open spacing between the shells allowing free downward discharge of filtered particles from between adjacent shells.

2. The invention as defined in claim 1 in which the shell sides have corrugations running generally lengthwise along the projected extent of the shells and tapering sidewardly to form downwardly inclined ledges off which said filtered particles tend to gravitate, said air filter shell assemblies including metallic stiffeners extending lengthwise of said shells and plate means interconnecting the stiffeners at lengthwise opposite ends of the filter shells, certain corrugations being individually attached to said stiffeners, and elongated connectors running between the plates at opposite ends of the filter shells and removably attaching individual assemblies to the manifold, said chamber having an upper opening and a removable closure therefor, said opening providing direct access to said connectors to facilitate removal of said assemblies for servicing thereof when said closure is removed from said opening.

3. For combination in a mobile power sweeper having a hopper chamber for receiving swept articles, means including a blower and a manifold communicating with the blower, the improvement which comprises a lengthwise elongated air filter shell assembly removably attachable to said manifold with the assembly shells having elevated exposure to the hopper chamber so that suction air flows between the hopper chamber and blower and in separate streams through said shells, each shell being comprised of air permeable material forming multiple re-entrant side recesses so that filtered particles collecting on the shells tend to gravitate out of said recesses and into the hopper chamber, each assembly including at least two shells having corrugated filter-paper sides which extend generally vertically, adjacent shells being closely spaced in side by side relation and supported to resist outward displacement of the shell material forming said recesses and toward adjacent shell structure for maintaining generally vertically open spacing between the shells allowing free downward discharge of filtered particles from between adjacent shells.

4. For combination in a mobile power sweeper having a hopper chamber for receiving swept articles, means including a blower and a manifold communicating with the blower, said manifold having a generally upright and horizontally elongated plate containing a series of horizontally spaced air inlet openings and said plate containing fastener recesses above and below each of said openings, the improvement which comprises a lengthwise elongated air filter shell assembly removably attachable to said manifold with the assembly shells having elevated exposure to the hopper chamber so that suction air flows between the hopper chamber and blower and in separate streams through said shells, each shell being comprised of air permeable material forming multiple re-entrant side recesses from which filtered particles tend to gravitate, the shells of said assembly being supported by plate means and fasteners having supporting attachment to the plate means and axes extending lengthwise generally parallel the shell lengthwise dimensions and in such vertically offset relation as to be alignable with said manifold plate recesses whereby said fasteners may be removably attached in supported relation to said manifold plate, adjacent shells being closely spaced in side by side relation and supported to resist outward displacement of the shell material forming said recesses and toward adjacent shell structure for maintaining generally vertically open spacing between the shells allowing free downward discharge of filtered particles from between adjacent shells.

5. In a mobile power sweeper, a chamber having a lower hopper section for receiving swept articles, a blower for creating air flow from the hopper through the upper interior of the chamber, an air filtering shell comprised of air permeable material having generally vertical sides forming multiple re-entrant recesses openly exposed in the upper interior of said chamber with the shell interior communicating with said blower so that said air flows into the shell and filtered particles collecting on the shell outer sides tend to gravitate out of said recesses and off the shell, and means for supporting the shell and resisting such outward displacement of the shell material forming said recesses as would impede free downward discharge of filtered particles past lower recesses, said means including a manifold through which the shell interior communicates with the blower, said chamber having an upper opening and a removable closure therefor, said opening providing direct access to said filter shell for servicing thereof when said closure is removed from said opening.

6. In a mobile power sweeper, a chamber having a lower hopper section for receiving swept articles, a blower for creating air flow from the hopper through the upper interior of the chamber, and an array of air filter shells each comprised of air permeable material having generally vertical sides forming multiple re-entrant recesses openly exposed in the upper interior of said chamber with the shell interiors communicating with said blower so that said air flows in separate streams through the shells and filtered particles collecting on the shell outer sides tend to gravitate out of said recesses and off the shells, and means for supporting adjacent shells in closely spaced side by side relation and resisting outward displacement of the shell material forming said recesses and toward adjacent shell structure to maintain generally vertically open spacing between adjacent shells allowing free downward discharge of filtered particles from between adjacent shells, said means including a manifold through which the shell interiors communicate with said blower, said chamber having an upper opening and a removable closure therefor, said opening providing direct access to said filter shells for servicing thereof when said closure is removed from the opening.

7. In combination, a chamber for receiving debris, a blower for creating gas flow from the chamber interior, and an array of gas filter shells each comprised of gas permeable material having generally vertical sides forming multiple re-entrant recesses openly exposed in the chamber interior with shell interiors communicating with the blower so that gas may flow in separate streams through the shells and filtered particles collecting on the shell outer sides tend to gravitate out of said recesses and off the shells, and means for supporting adjacent shells in closely spaced side by side relation and resisting outward displacement of the shell material forming said recesses and toward adjacent shell structure to maintain generally vertically open spacing between adjacent shells allowing free downward discharge of filtered particles from between adjacent shells, said means including a manifold through which the shell interiors communicate with said blower.

8. The assembly of claim 7 in which the shell sides have corrugations running generally lengthwise along the projected extent of the shells and tapering sidewardly to form downwardly inclined ledges off which said filtered particles tend to gravitate, said assembly including metallic stiffeners extending lengthwise of said shells and plate means interconnecting the stiffeners at lengthwise opposite ends of the shells.

References Cited by the Examiner
UNITED STATES PATENTS

| | | | |
|---|---|---|---|
| 2,020,120 | 11/35 | Leathers | 55—341 |
| 2,784,440 | 3/57 | Newport | 15—340 |
| 2,980,208 | 4/61 | Neumann | 55—500 |

HARRY B. THORNTON, *Primary Examiner.*